(No Model.)  9 Sheets—Sheet 1.

J. LAUDE.
HOISTING MACHINE.

No. 366,488.  Patented July 12, 1887.

Fig. 1.

Witnesses:
B. C. Fenwick
G. S. Cooper

Inventor:
Julius Laude
By J. A. Adriaans
His Attorney (No Model.) 9 Sheets—Sheet 5.

J. LAUDE.
HOISTING MACHINE.

No. 366,488. Patented July 12, 1887.

Fig.5.

Witnesses
B. C. Fenwick
G. S. Cooper

Inventor
Julius Laude

By J. H. Adriaans.
His Attorney.

(No Model.) 9 Sheets—Sheet 7.

J. LAUDE.
HOISTING MACHINE.

No. 366,488. Patented July 12, 1887.

Witnesses:
B. C. Fenwick
G. S. Cooper

Inventor:
Julius Laude
By J. H. Adriaans
His Attorney

(No Model.) 9 Sheets—Sheet 8.

J. LAUDE.
HOISTING MACHINE.

No. 366,488. Patented July 12, 1887.

Witnesses:
B. C. Fenwick
G. S. Cooper

Inventor Julius Laude
By His Attorney J. K. Adriaans

(No Model.)　　　　　　　　　　　　　　　9 Sheets—Sheet 9.
J. LAUDE.
HOISTING MACHINE.

No. 366,488.　　　　　　　　Patented July 12, 1887.

Witnesses:
B. C. Fenwick
G. S. Cooper

Inventor
Julius Laude
By J. K. Adriaans
His Attorney

United States Patent Office.

JULIUS LAUDE, OF LA CROSSE, WISCONSIN.

HOISTING-MACHINE.

SPECIFICATION forming part of Letters Patent No. 366,488, dated July 12, 1887.

Application filed November 23, 1886. Serial No. 219,696. (No model.)

*To all whom it may concern:*

Be it known that I, JULIUS LAUDE, of La Crosse, in the county of La Crosse and State of Wisconsin, have invented certain new and useful Improvements in Lumber-Piling Machines; and I do hereby declare that the following is a full, clear, and exact description thereof, reference being had to the accompanying drawings, and to the letters of reference marked thereon, which form part of this specification.

My invention relates to mechanism for elevating bulky substances or materials, as lumber, rails, and stone; and its objects will hereinafter more fully appear by reference to the description and drawings. I accomplish these purposes by the mechanism illustrated in the accompanying drawings, in which—

Similar letters indicate corresponding parts in the several views.

From a truck, 1, depend brackets 2, which afford bearings for the rollers 3. The brackets have a swivel motion by reason of the headed pins 89, so that the rollers can face any given direction. A tongue, 8, rigidly secured to a block, 6, by pins 9, said block being pivotally connected to yoked frame 7 by pin 90, which frame in turn is attached to cross-bar 5 by pins 91, and said cross-bar being rigidly secured at either end by screws 10 to the pivoted blocks 4, in which the pins 89 are imbedded, affords means whereby the entire machine may be transported. Placed over the lower frame or truck, 1, are track-sills 76, having inwardly-projecting flanges, 140, on which rest spacing devices 11. Guide-strips 72 are centrally secured to the upper surfaces of the sills 76, which form a track for the rollers 73, which are secured to the supporting-beams of the lumber-hoisting carriage 74.

To the outer sides of the beams 74 are rigidly secured the supporting-posts 30, the forward pair being secured by pins 126, and the pins 44 of the rear pair serve additionally as fulcrums for foot-levers 79, connected by cross-bar 80, by means of which the descent of the platform 54 can be effected from the ground. The upper surfaces of the beams 74 support bearing-blocks 25, in which a conical roller, 26, is secured, thereby facilitating the loading and unloading of the lumber 13. To the floor or frame-bars 74 are also rigidly secured the bases of two pairs of upright guide-rods, 29, being partially encircled by springs 135, connected thereto at one end by pins 114, and at the other end to concentric reciprocatory sleeves 28 by pins 142, so that the ascent of said sleeves and their connected bars 66, 54, and 47 shall be assisted by the resiliency of the springs, while their descent is cushioned by their elasticity. To the beams 74 are also secured centrally the lower ends of two hoisting-cables, 83, by staples 129. These cables successively pass through the sliding cross-bars 66, the platform-supporting bars 23, the floor or platform 54, about the round ends of the square shaft 130, through the floor or beams 96, and are finally wound upon the rotary shafts 82, to which their other ends are affixed, said shafts revolving in bearings 36, and having ratchet-wheels 38, regulated by pawls 37, secured to the beams 96, whereby the proper tension of the cables is insured.

As already mentioned, blocks 11, having projections from their bases, slide on flanges 140 at both ends of the machine. T-shaped grooves are formed in their upper surfaces to accommodate the sliding spacing-blocks 12, by means whereof the lumber is automatically spaced, and play for the clamping-heads 122 of the grasping-fingers 15 is afforded, so that when the lumber to be stacked or loaded is passed over the roller 26 it will necessarily fall between the spacing-blocks 12 upon the upper surfaces of the blocks 11, by reason of the upward taper of the former, and as each layer is thus formed separating-sticks 14 can be laid transversely at either end. To the upper surfaces of the sliding cross-bars 66 are rigidly secured the bases of the two pairs of sliding sleeves 28, whose upper terminals are similarly joined to the cross-bars 47. The left bar or rod is horizontally perforated at either end to guide the passage of the shifting-cords 81, which operate the grasping-fingers 15 from the ground. The bars 66 are also vertically perforated to permit the insertion of cables 83 therethrough. Struts 67 project laterally from the outer sides of the rods 66, serving to apply the force imparted to the foot-levers 79 by means of connecting-rods 125, pivoted on the same pins 69, whose outer ends rigidly connect the lower termini of the middle stays, 48.

From the frame-bars 23 project lateral extensions 24, equidistantly from a transverse median line, in which are embedded suitable headed pins, 50, whereon the lower ends of the serrated outer stays, 49, are adjustably secured, their upper ends having common pivots 130 with the inner stays, 48, both pairs being thus respectively joined rigidly to the cross-bars 47, whereby the distance between the platform 54 and the bars 47 can be readily altered to suit varying conditions. To the sides of the frame-bars 23 are also rigidly united the bearing-blocks 52, which support the ends of the axle 51, to which the pawls 53 are terminally united. A knob or roller, 93, serves alternately, by manipulation from the platform 54 or by a cord, 144, from the ground, to make and break engagement of the pawls with the ratchet-wheels 59, whereby their rotation in other than the contemplated direction is rendered impossible. Similar blocks, 109, perform a like function in the working of pawls 58, mounted on shaft 113, provided with a similar knob, 147, from which cord 145 reaches to the ground, which engage ratchet-wheels 60, when the pawls 53 have broken contact with wheels 59, and conversely. The left blocks 52 and 109 have holes 119 to permit the movement of shifting-cords 81.

Figure 1:
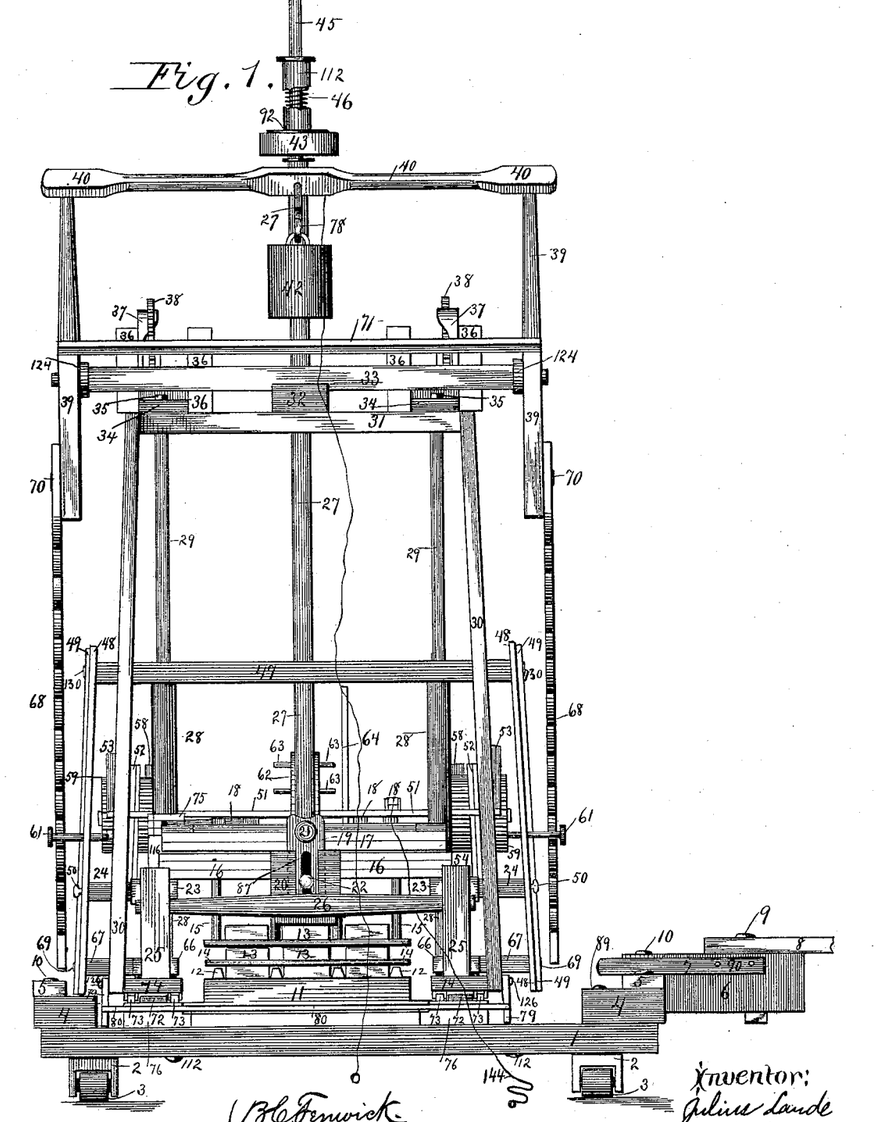
Figure 1 represents a front elevation of a machine embodying the several features of my invention with the platform in a depressed or normal state.
Figure 2:
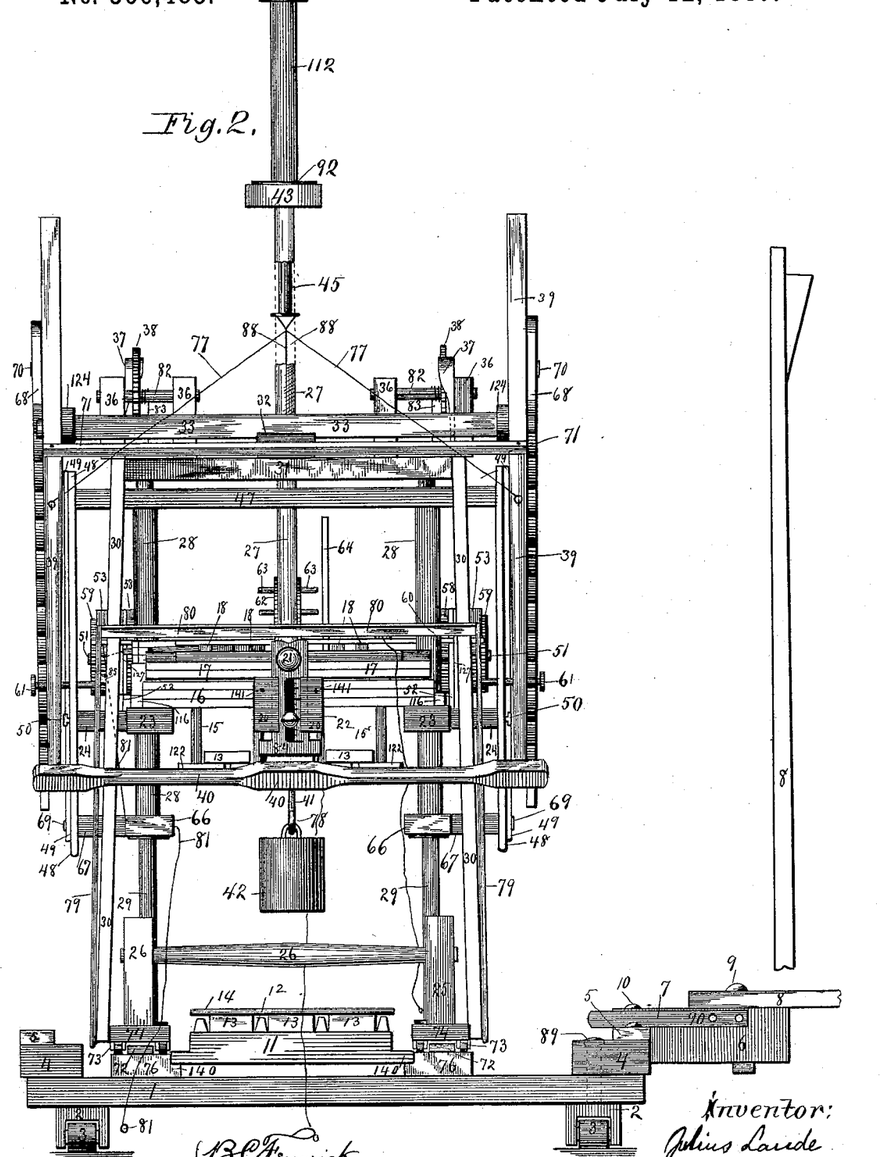
Fig. 2 is a similar view showing said platform in a raised position.
Figure 3:
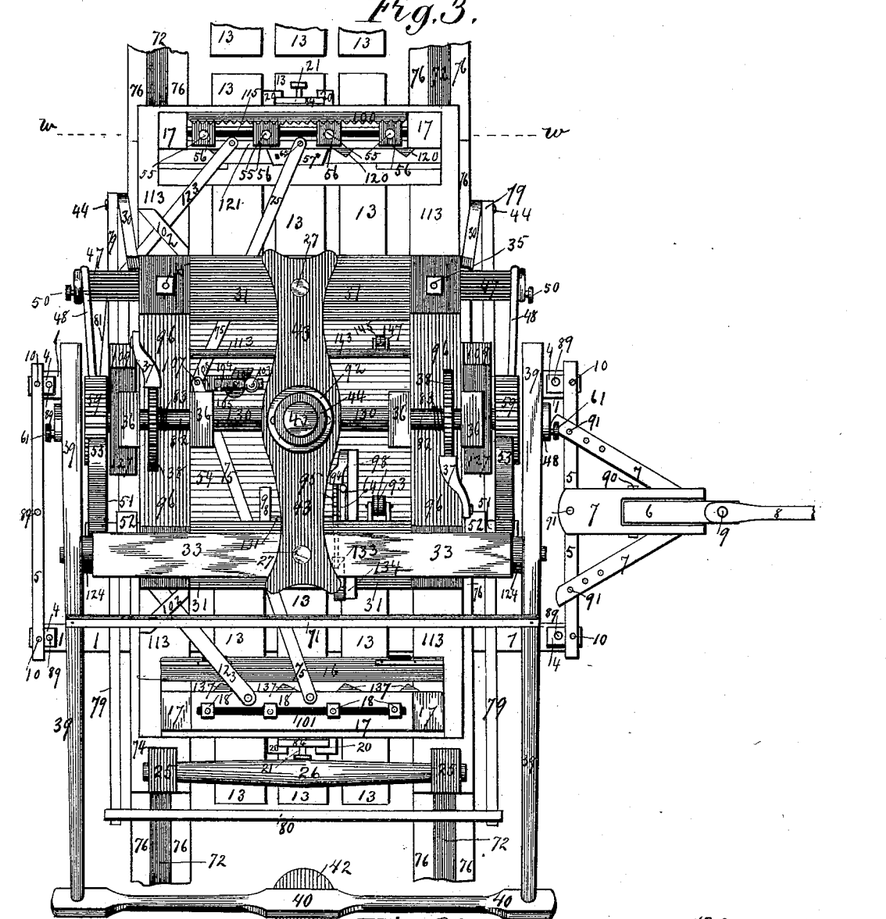
Fig. 3 is a top plan view of the same.
Figure 4:
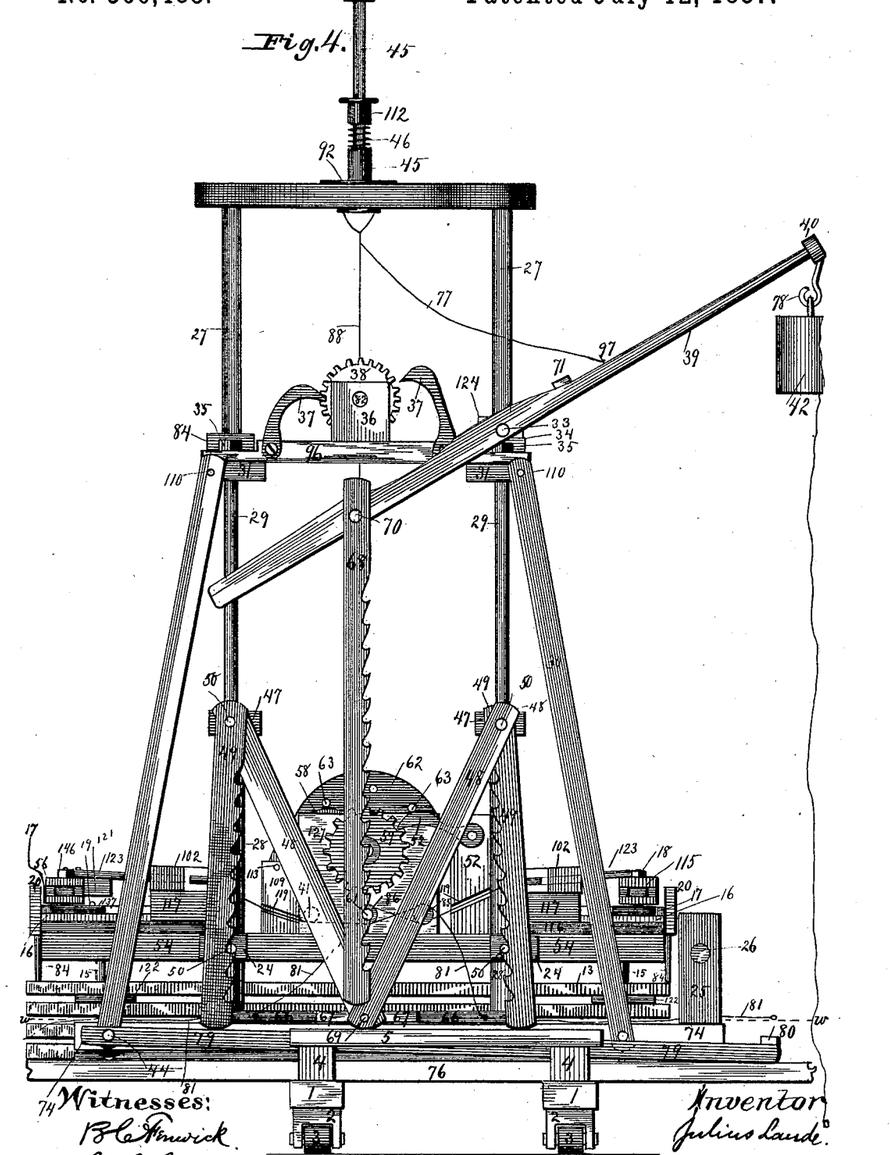
Fig. 4 is a side elevation thereof.
Figure 5:
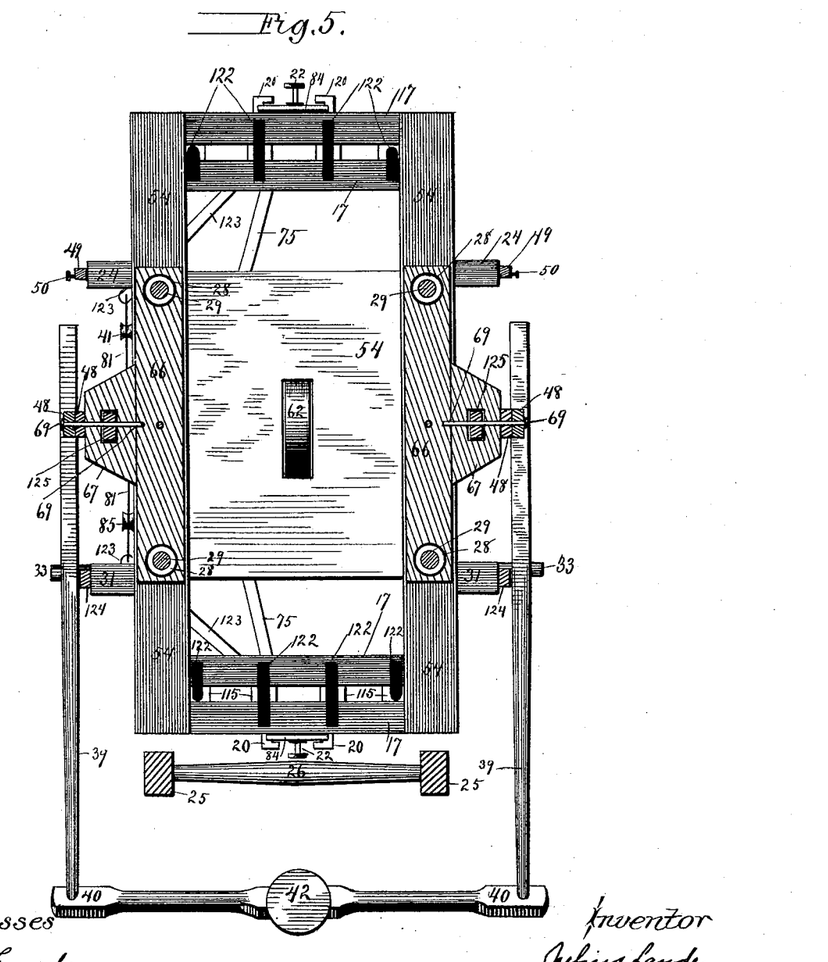
Fig. 5 is a sectional plan looking upward from the line $w\,w$ of Fig. 4.
Figure 6:
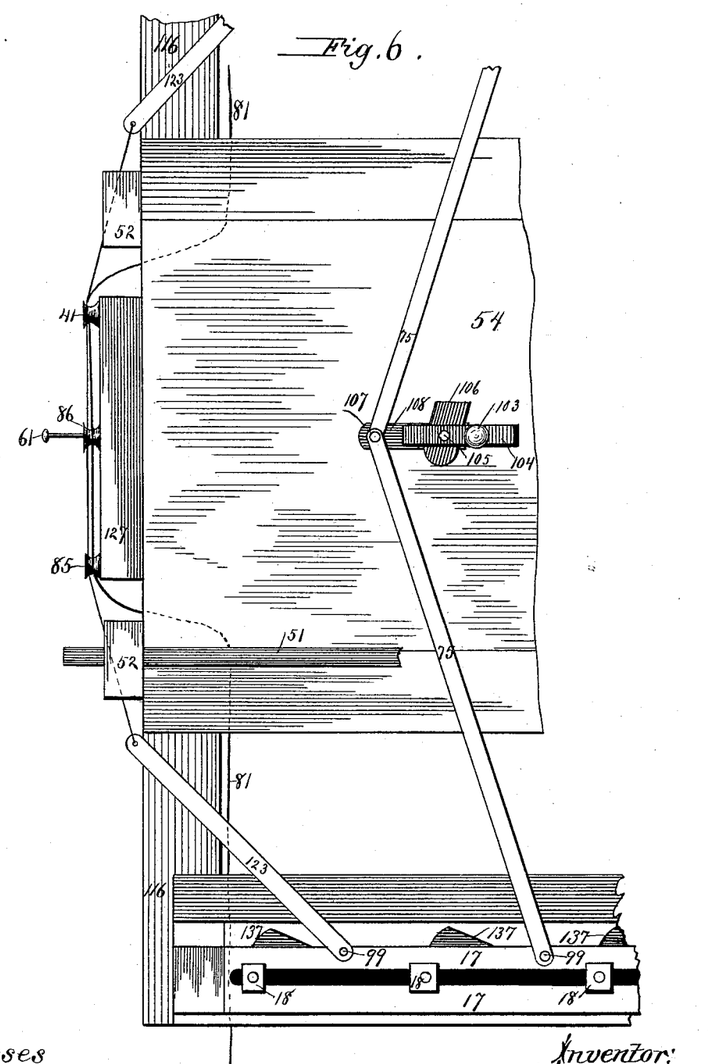
Fig. 6 is an enlarged detail plan view of the mechanism for shifting the grasping devices.
Figures 7, 9, 10, 11:
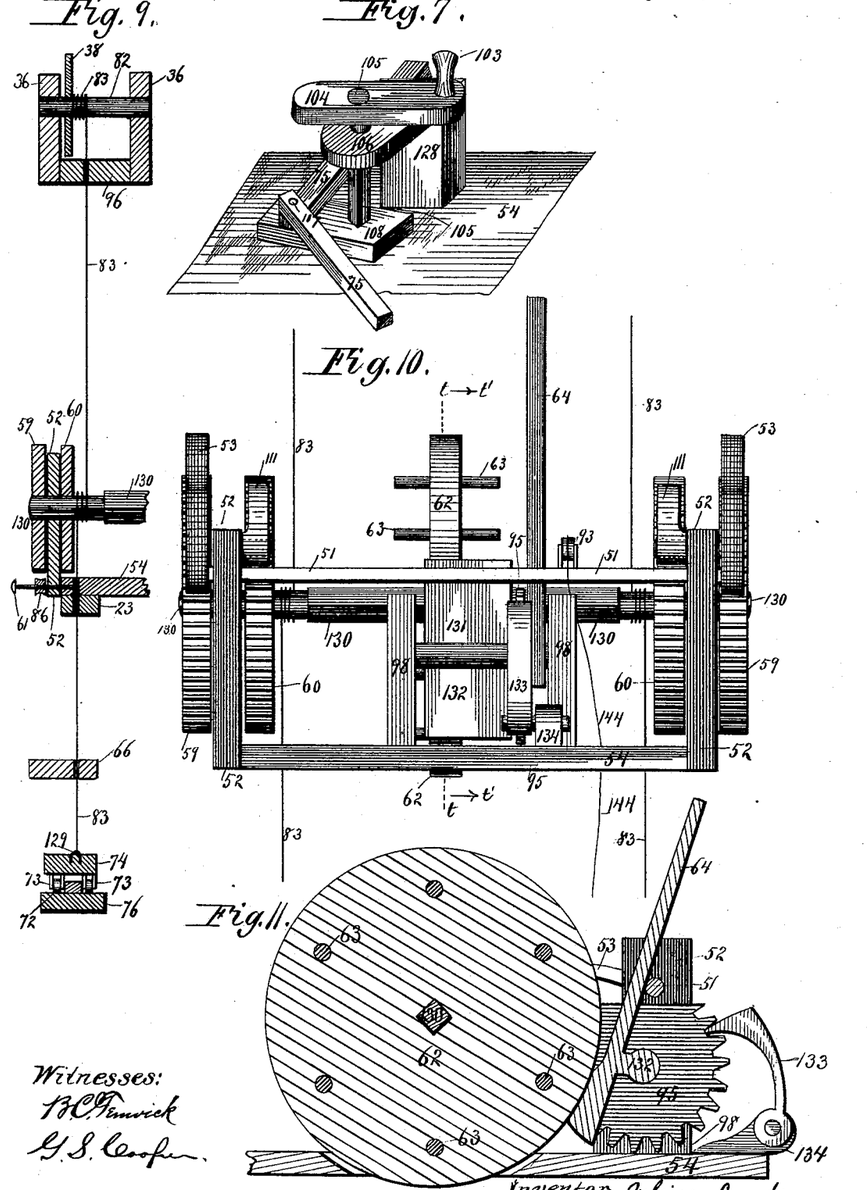
Fig. 7 is a perspective detail view of the shifting device.
Fig. 9 is a vertical section through the end portion of the hoisting-machine.
Fig. 10 is a detailed elevation showing the platform-hoisting mechanism and the braking device.
Fig. 11 is a transverse section of Fig. 10 through the line $t\,t$, looking in the direction of the arrows $t'\,t'$.

Between the two sets of blocks 52 and 109 are secured, upon the upper surfaces of the frame-bars 23, bearing-blocks 127, which serve to support the rounded ends of the square main axle 130, on which the windlass-wheel 62, propelled by power applied to handles 63, is centrally mounted, the termini of which axle also support the ratchet-wheels 59 on the outer sides of the block 127 and the ratchet-wheels 60 on the inner sides thereof. Below the wheels 59 are mounted rollers or pulleys 41, 85, and 86 in a common horizontal plane, the middle one serving to cross the shifting-cords 81, and the outer ones to facilitate their operation. The headed axis 61 of the central roller subserves additionally the function of adjustably joining the ratchet-bar 68, whose upper end is pivotally united to the hand-levers 39 by pins 70, whereby the limit of ascension of the platform is rendered variable, said hand-levers moving synchronously, because connected by cross-bar 40, from which a hook, 78, centrally depends, whereupon any amount of weight, 42, may be suspended to balance the parts, and to which a suitable cord may be secured to operate said levers from the ground. The frame-bars 23 also support the platform 54, from which, as well as from the ground, the entire machine may be operated. Near the axle 130 are secured to the platform 54 upright bearings 98, which support the ends of square axle 130, on which the mutilated ratchet-wheel 95 and its operating-lever 64 are adjacently mounted, as shown in Fig. 11, and to which the brake block 131 rigidly adheres, whereby the rotation of the hand-wheel can either be checked or stopped according to the degree of pressure applied. On either side of wheel 95 are pawls 94 and 133, working in blocks 98 and 134 in opposite directions, whereby a given degree of power exerted is maintained at the brake-block 131. The frame-bars 23 also support the extensions 116, approximately horizontal with the platform 54, whereon the blocks 117 rest, to which the guide blocks 102 are rigidly secured, whereby the reciprocations of the connecting rods 123 are directed. Upon the extensions 116 the cross-frames 16 and 17 are maintained, which contain the mechanism for operating the grasping-fingers 15, consisting of a cross-piece, 143, sliding in slot 101, and shifted either by the levers 123 from the ground or 75 from the platform, to which the cross-piece 143 is connected by pins 99. The reciprocations of this cross-piece effect the movement in the arc of a circle of small rocking blocks 18, which are joined by pins 138 to similar rocking blocks, 137, which are in turn similarly united by pins 139 to rocking blocks 136, from which the fingers 15, having clamping-heads 122, depend, whereby the movement of all these parts is synchronously effected by the oscillations of the levers 75 123, and the fingers simultaneously grasp or drop the lumber 13. The mechanism for causing the shifting of the levers 75 is particularly shown in Figs. 6 and 7, and consists of a knob, 103, attached to arm 104, in which the upper end of the pin 105 is rigidly embedded. This pin works in a bearing, 106, secured to a stationary block, 128, on the platform 54, and terminates in a square end inclosed in sliding piece 108, to which the levers 75 are pivoted by pin 107.

Pawls 111 are secured to the upper inner faces of the bearing-blocks 127, and serve the same office to cog-wheels 60 that pawls 53 perform for wheels 59. The upper ends of the stationary guide-rods 29 terminate with the cross-bars 31, to which they are secured by bolts 35 and interposed washers 34; also, the upper termini of the stay-bars 30 end with the bars 31, being secured thereto by pins 110. Strengthening-block 32 separates the forward cross-bar, 31, from the cross-piece 33, whose rounded ends serve as fulcrums for the hand-levers 39, suitable washers, 124, providing for this motion.

Figure 8:
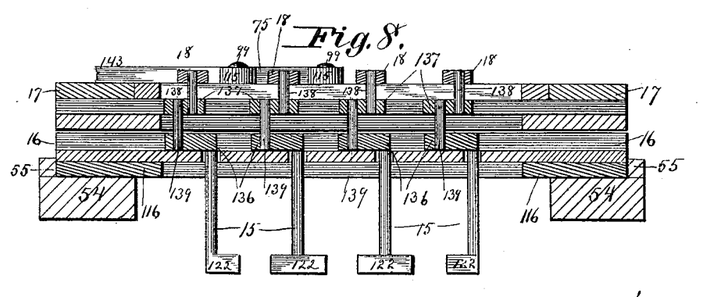
Fig. 8 represents a vertical section through the grasping device, showing the means of actuating the fingers.
Figures 12, 13:
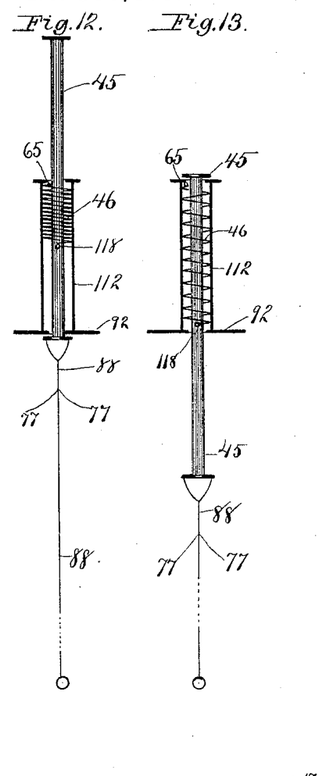
Fig. 12 is a view, partly in section, of the device whereby the descent of the platform can be effected from said platform, the view being taken while the platform is at the upper level.
Fig. 13 is a similar view taken when the platform is in its lower plane.
Figure 14:
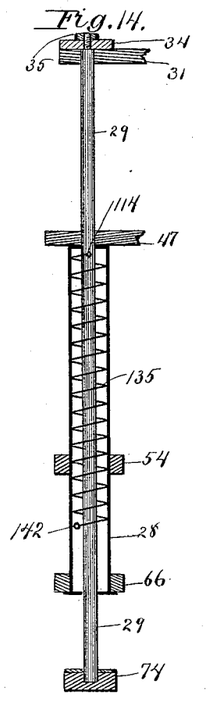
Fig. 14 represents the cushioning device, whereby the ascent of the platform is accelerated and the descent regulated, the view being taken when the platform is in its lower plane of reciprocation.
Figure 15:
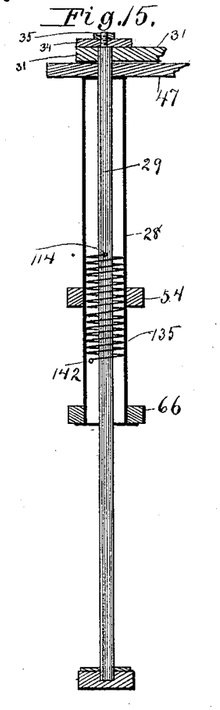
Fig. 15 is a similar view illustrating the position of the parts when the platform has reached the upper limit of its travel.
Figure 16:
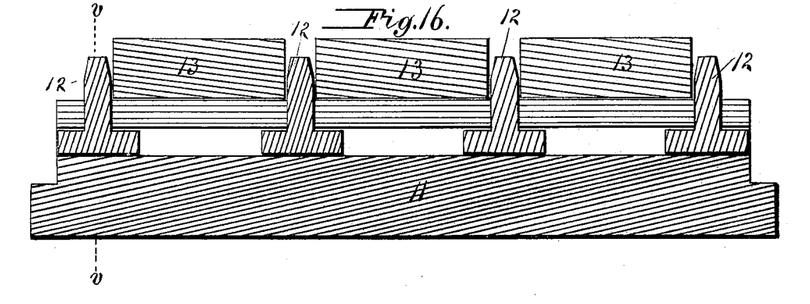
Fig. 16 is a longitudinal section of the spacing device.
Figure 17:
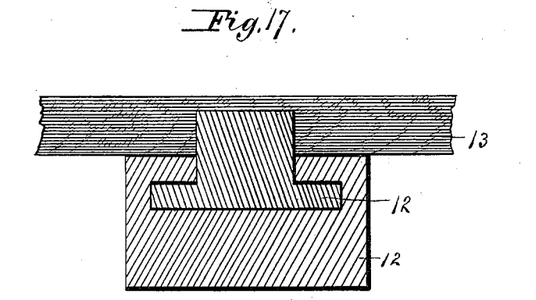
Fig. 17 is a transverse section on the line $v\,v$ of Fig. 16.
Figure 18:
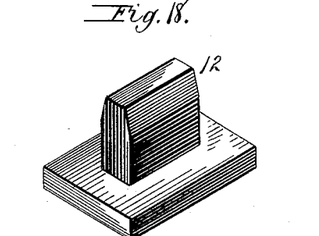
Fig. 18 is a detailed view of the spacer.
Figure 19:
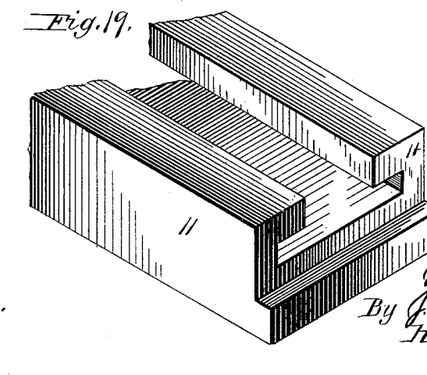
Fig. 19 shows the grooved bed wherein it operates.
Figure 20:
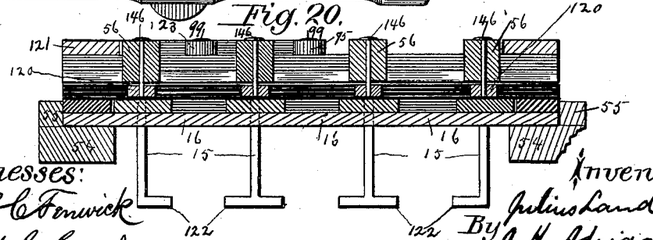
Fig. 20 is a cross section on the line $w\,w$ of Fig. 3, showing a modification of mechanism for manipulating the carrier-fingers.

The grasping mechanism may be of either of the types shown in Figs. 8 and 20, the effect being the same, but the means slightly different. Thus the motion of the levers 75 and 123 may be transmitted to a sliding cross-frame, 121, guided by block 57 and having slot 115, containing serrated square rocking blocks 56, rigidly held on pins 146, whose lower ends are embedded in blocks 120, pivotally secured to the frame-piece 16 by pin 19, from which the fingers 15 depend. The parts move simultaneously, because of the indentations in cross-pieces 100 registering with the serrations in the rocking blocks 56. To the front of the cross-frame 16 are rigidly secured, by pins 141, guide-frames 20, within which slides a gage, 84, adjustable by screw 22, in slot 87 and raised by handle 21, whereby the number of layers of material to be elevated is limited. Guide-rods 27 ascend from the platform through the cross-bars 47 31 and cross-bar 33, and their strengthening-pieces 32 and 84, terminating in the top cross-frame, 43.

Upon the cross-frame 43 the flange 92 of a tubular upright or sleeve, 112, is rigidly secured. Within it is a spring, 46, whose upper end is attached to the sleeve 112 by pin 65, and whose lower end is similarly joined to reciprocating rod 45 by pin 118. From the lower end of this shaft depends a ringed cord, 88, accessible from the platform 54, or from the ground, and having near its upper end branching cords 77, which are secured to the levers 39 by pins 97, whereby the operator can cause the descent of the platform, either therefrom or from the ground, by pulling the cord 88, which raises the levers 39 by means of the cords 77, the pawls having meanwhile been shifted properly. The elasticity of the spring 46 serves to restore the cord 88. A cross-rod, 71, additionally to the cross-piece 33, connects the ends of the hand-levers 39.

The operation is as follows: The truck 1 is transported to the point whence the material is to be removed. It is there loaded by passing the lumber 13 over the roller 26, and it falls between the spacing-blocks 12 upon the sliding blocks 11. As the layers are formed cross-pieces 14 are inserted to separate them. When the altitude of the loaded pile is commensurate with the limit prescribed by the gage 84, the fingers 15 are pushed between the lumber and turned either by the levers 123 from the ground or 75 from the platform, so that the clamping-heads 122 will grasp the lumber between them. The platform 54 then ascends either by pulling the hand-levers 39 from the ground or by turning the large windlass 62 from the platform, the clamping-heads meanwhile lifting the lumber by being themselves elevated. When the height of the stack is reached, the carriage is moved upon rollers 73, so that the lumber will be suspended directly over the stack. The fingers are then again turned by reversing the previous movement, and the lumber falls by gravity upon the stack. In ascending, the pawls 53 and 111 are called into requisition; in descending, the pawls 58 are relied on. The distance between the shafts 130 and 82 diminishes in ascension and increases with descension, which will be denoted by the clear length of cable 83 between them.

Having thus fully described my invention and shown its comparative status in the art, what I claim, and desire to secure by Letters Patent of the United States, is—

1. The combination of the actuating-levers, the pivoted blocks, and the grasping-fingers connected to said blocks, as set forth.

2. The combination of the levers 75, the operating-crank, the sliding frame, the pivoted blocks, and the grasping-fingers secured to said blocks.

3. The combination of the levers 123, the operating cords, the pulleys, the sliding frame, the pivoted blocks, and the grasping-fingers secured to said blocks, for the purpose herein fully set forth.

4. The combination of the grooved-bed 11 with the sliding blocks 12, the blocks being dovetailed in the bed and adapted to space the lumber automatically as it falls thereon, substantially as described.

5. The platform suitably connected with the elevating and depressing levers, in combination with the hoisting-lever having an operating-cord depending therefrom, and the depressing-lever, whereby said platform may be reciprocated from the ground, for the purpose set forth.

6. The platform suitably connected with the elevating and depressing levers, in combination with the actuating hand-wheel mounted thereon, the hoisting-cables, and the devices for varying the tension of said cables, as set forth.

7. The platform suitably connected with the elevating and depressing levers, in combination with the spring-encircled supporting-rods incased, as shown, and the elevating and depressing levers, as herein fully shown and described.

8. The combination of the platform provided with suitable pins projecting therefrom, the elevating-lever, and the ratchet-arms depending from the elevating-lever to adjust said platform, all for the purpose and in the manner specified.

9. The combination of the platform, having a hand-wheel mounted thereon and suitable pins projecting therefrom, with the elevating-lever, the ratchet-arms depending from said lever to adjust the platform relatively to the truck, and the hoisting-cables, operating as herein illustrated and specified.

10. The platform having suitable pins projecting therefrom, in combination with the ratchet-arms adapted to engage therewith, the elevating and depressing levers, the hoisting-cables, and the devices for regulating their tension.

11. The platform constructed and operating as herein set forth, and having a suitable hand-wheel disposed thereon, in combination with the spring-encircled supporting-rods incased, as shown, and the elevating and depressing levers, operating as illustrated and specified.

12. The fingers 15, having clamping-heads 122, in combination with the rocking blocks 136, 137, and 18, connecting pins 139 138, the support 16, and the frame 17.

13. The fingers 15, having clamping-heads 122 depending from rocking blocks 136, the blocks 18, and intermediate blocks, 137, connected by pins 139 138, in combination with the sliding cross-piece 143, its embedded rocking blocks 115, and the lever 123, joined thereto at one end, and the other end connecting to the operating-cord 81, substantially as described.

14. The platform 54, having suitable pins, 61, projecting therefrom, in combination with the ratchet-arms 68, engaging therewith, the cables 83, and the means shown for regulating their tension, the elevating-lever 40, whose arms 39 are connected to the ratchet-arms, and the depressing-lever 80.

15. The platform 54, having suitable pins, 61, projecting therefrom, in combination with the ratchet-arms 68, engaging therewith, the cables 83, and the devices shown for regulating their tension, the elevating-lever 40, whose arms 39 are connected to the ratchet-arms, the depressing-lever 80, and the spring-encircled supporting-rods 29 incased, as shown, in sleeves 28.

16. The platform 54, having suitable pins, 50 61, projecting therefrom, in combination with the ratchet-arms 48 49 68, engaging therewith, the rods 29, supporting said platform, having reciprocating sleeves 28, inclosing springs 135, the cables 83, and the devices shown for regulating their tension, the elevating-lever 40, whose arms 39 are connected to the ratchet-arms 68, and the depressing-lever 80, whose arms 79 are pivoted to the truck, as shown.

17. The combination of the fingers 15, having clamping-heads 122 depending from pivoted blocks 120, which move synchronously with serrated rocking blocks 56 by reason of connecting-pins 146, the toothed cross-bar 100, and the sliding frame 121, the levers 75 and their operating-crank, for the purpose shown.

18. The elevating-lever 40, the depressing-lever 80, the hand-wheel 62, and the spring-encircled supporting-shafts 29, in combination with the hoisting-cables 83, as shown.

19. The platform 54, in combination with the hand-wheel 64, the axle 130, the cables 83, and the devices illustrated for regulating their tension.

20. The blocks 11, having flanges projecting laterally from their bases, and T-grooved upper surfaces, in combination with the tapering spacing-blocks 12, adapted to slide in said grooves, and the track-sills 76, on which the blocks adjustably rest.

21. The combination of the blocks 11, having flanges projecting laterally from their bases, and grooves on their upper faces, the tapering spacing-blocks 12, adapted to slide in said grooves, the track-sills 76, on which the blocks adjustably rest, and the roller 26, having bearings 25.

22. The combination of the blocks 11, having flanges projecting laterally from their bases, and grooves on their upper faces, the tapering spacing-blocks 12, adapted to slide in said grooves, the track-sills 76, on which the blocks adjustably rest, the roller 26, and the sliding gage 84.

23. The platform 54, having bearing-blocks 127 mounted thereon, provided with projecting headed pins 61, in combination with the ratchet-bars 68, and the pivoted hand-lever 40, having attached thereto the weight 42, and from which a suitable operating-cord depends.

24. The sliding bars 66, having lateral extensions 67, in which are fulcra 125 for the arms 79 of the depressing-lever 80, in combination with the beams 74, as shown.

25. The combination of the hoisting-cables 83, having their ends secured, respectively, to the frame supporting beams 74 and the axles 82, the axle 130, the hand-wheel 62, having radial spokes 63, the ratchet-wheels 59 60, and the pawls 53 111, as shown.

26. The combination of the hoisting-cables 83, having their ends secured, respectively, to the frame-supporting beams 74 and the axles 82, the axle 130, the hand-wheel 62, the ratchet-wheels 59 60, and the pawls 58, for the purpose shown and described.

27. The combination of the hoisting-cables 83, having their ends secured, respectively, to the frame supporting beams 74 and the axles 82, the axle 130, the hand-wheel 62, the brake-block 131, operating-lever 64, locking-pawls 94 133, ratchet-wheels 59 60, and the pawls 58, substantially as herein shown and described.

28. The combination of the reciprocating sleeves 28, having connected thereto the cross-bars 47 and 66, and the platform 54, the guide-rods 29, connected to the frame-bars 74 and 31, and the springs 135, having their upper ends connected to the guide-rods 29, which they encircle, and their lower ends connected to the sleeves 28, as shown.

29. The hoisting-cables 83, having their ends secured, respectively, to the frame-supporting beams 74 and the axles 82, the axle 130, the hand-wheel 62, the ratchet-wheels 59 60, and the locking-pawls 53 111, in combination with the reciprocating sleeves 28, having connected thereto the cross-bars 47 66, and the platform 54, the guide-rods 29, connected to the frame-bars 74 31, and the springs 135, having their upper ends connected to the guide-rods 29, which they encircle, and their lower ends secured to sleeves 28.

30. The hoisting-cables 83, having their ends secured, respectively, to the frame-supporting beams 74 and the axles 82, the axle 130, the hand-wheel 62, the ratchet-wheels 59 60, and the locking-pawls 58, in combination with the reciprocating sleeves 28, having fastened thereto the cross-bars 47 66, and the platform 54, the guide-rods 29, connected to the frame-bars 74 31, and the springs 135, having their upper ends connected to the guide-rods 29, which they encircle, and their lower ends secured to sleeves 28, as shown.

31. The hoisting-cables 83, having their ends secured, respectively, to the frame-supporting-beams 74 and the axles 82, the axles 130, the hand-wheel 62, the ratchet-wheels 59 60, the locking-pawls 58, and the brake-block 131, operated by lever 64, whose applied pressure is maintained by pawls 94 133, in combination with the reciprocating sleeves 28, having fastened thereto the cross-bars 47 66, and the platform 54, the guide-rods 29, connected to the frame-bars 74 31, and the springs 135, having their upper ends connected to the guide-rods 29, which they encircle, and their lower ends secured to sleeves 28.

32. The combination of the hoisting-cables 83, having their ends secured, respectively, to the frame-supporting beams 74 and the axles 82, the axles 130, the hand-wheels 62, the brake-block 131, operated by lever 64, whose applied pressure is maintained by pawls 94 133, the ratchet-wheels 59 60, the locking-pawls 53 111, the track sills 76, having tracks 72, and the superposed beams 74, provided with rollers 73.

33. The hoisting-cables 83, having their ends secured, respectively, to the frame-supporting beams 74 and the axles 82, the axle 130, the hand-wheel 62, the brake-block 131, pawls 94 133, the ratchet-wheels 59 60, and the locking-pawls 53 111, in combination with the reciprocating sleeves 28, having fastened thereto the cross-bars 47 66, and the platform 54, the guide-rods 29, connected to the frame-bars 74 31, the springs 135, having their upper ends connected to the guide rods 29, which they encircle, and their lower ends secured to the sleeves 28, and the track-sills 76, having tracks 72, and the superposed beams 74, provided with rollers 73, for the purpose set forth.

34. The frame 36, having axle 82 and ratchet-wheel 38, in combination with the cables 83, whereby the tension of said cables is regulated, for the purposes herein fully shown and described.

35. The frame 36, having axle 82 and ratchet-wheel 38, in combination with the cables 83, the axle 130, the hand-wheel 64, and the platform 54, as shown.

36. The frame 36, having axle 82 and ratchet-wheel 38, in combination with the cables 83, the axle 130, and the elevating and depressing levers 40 80, as shown.

37. The combination of the frame 16, with the counterpart flanged guide-pieces 20, the graduated slotted gage 84, having handle 21, and adjusting-screw 22, the blocks 11, having spacing-blocks 12, and the roller 26, as described.

38. The frame 36, having axle 82 and ratchet-wheel 38, in combination with the cables 83, the platform 54, constructed and operating as shown, having a hand-wheel, 64, thereon for actuating the cables, and the rods 29, supporting said platform, having reciprocating sleeves 28, inclosing-springs 135, for the purposes herein fully specified.

39. The frame 36, having axle 82 and ratchet-wheel 38, in combination with the cables 83, the axle 130, the platform 54, the spring-encircled rods 29, and the elevating and depressing levers 40 80, operating as shown and set forth.

40. The truck 1, having swiveled roller-brackets 2, and supporting the track-sills 76, on which the entire machine is mounted, in combination with the swiveled tongue 8, connected by pivoted rod 6 to armed yoke 7, which is pivotally united to cross-rod 5, and the intermediate joining-block, 4, as shown.

41. The platform 54, in combination with the hoisting-lever 40, having a weight, 42, and a suitable operating-cord suspended therefrom, and the cables 83, connected as shown, for the purposes described.

42. The cross-frame 43, in combination with the sleeve 112, secured thereto, containing a coiled spring, 46, whose lower end is secured to the rod 45, which it encircles, and the upper end fixedly joined to said sleeve, the operating-cord 88, the branching cords 77, and the hoisting-lever 40, from which a suitable cord depends, for the purpose shown and described.

43. The combination of the beams 96, having bearing-blocks 36, supporting the axles 82, having ratchet-wheels 38, the cables 83, and the pawls 37.

44. The cross-bars 66, having lateral extensions 67, in which are fulcra 125 for the depressing-lever 80, in combination with the beams 74, to which said lever-arms are pivoted, the bearing frame 43, having sleeve 112 secured thereto, containing a coiled spring, 46, whose lower end is connected to rod 45, which it encircles, and the upper end rigidly joined to said sleeve, the operating-cord 88, the branching cords 77, and the hoisting-lever 40, from which a suitable cord depends, for the purpose shown and described.

45. The hoisting-cables 83, whose ends are rigidly secured, respectively, to the beam 74 and the axles 82, in combination with the axle 130, the hand-wheel 62, having radial projections 63, the ratchet-wheels 59 60, the locking-pawls 58, the bearing-frame 43, having sleeve 112 secured thereto, containing a coiled spring, 46, whose lower end is connected to rod 45, which it encircles, and the upper end rigidly joined to said sleeve, the operating-cord 88, the branching cords 77, and the hoisting-lever 40, from which a suitable cord depends, for the purpose set forth.

46. The hoisting-cables 83, whose ends are rigidly secured, respectively, to the beams 74 and the axles 82, in combination with the axle 130, the hand-wheel 62, the brake-block 131, operated by lever 64, pawls 94 133, ratchet-wheels 59 60, locking-pawls 58, the bearing-frame 43, having sleeve 112 secured thereto, containing a coiled spring, 46, whose lower end is connected to rod 45, which it encircles, and the upper end rigidly joined to said sleeve, the operating-cord 88, the branching cords 77, and the hoisting-lever 40, from which a suitable cord depends.

47. The hoisting-cables 83, whose ends are rigidly secured, respectively, to the beams 74 and the axles 82, the axle 130, the hand-wheel 62, ratchet-wheels 59 60, locking-pawls 58, in combination with the reciprocating sleeves 28, having fastened thereto the cross-bars 47 66, and the platform 54, the guide-rods 29, connected to the frame-bars 74 31, the springs 135, having their upper ends connected to the guide-rods 29, which they encircle, and their lower ends secured to sleeves 28, the bearing-frame 43, having sleeve 112 secured thereto, containing a coiled spring, 46, whose lower end is connected to rod 45, which it encircles, and the upper end rigidly joined to said sleeve, the operating-cord 88, the branching cords 77, and the hoisting-lever 40, from which a suitable operating-cord depends, as shown.

48. The hoisting-cables 83, whose ends are rigidly secured, respectively, to the beams 74 and the axles 82, the axle 130, the hand-wheel 62, the brake-block 131, operated by lever 64, pawls 94 133, ratchet-wheels 59 60, locking-pawls 58, in combination with the sleeves 28, having fastened thereto the cross-bars 47 66, and the platform 54, the guide-rods 29, connected to the frame-bars 74 31, the springs 135, having their upper ends connected to the guide-rods 29, which they encircle, and their lower ends secured to sleeves 28, the bearing-frame 43, having a sleeve, 112, secured thereto, containing a coiled spring, 46, whose lower end is connected to rod 45, which it encircles, and the upper end rigidly joined to said sleeve, the operating-cord 88, the branching cords 77, and the hoisting-lever 40, from which a suitable operating-cord depends.

49. The hand-wheel 62 and brake-block 131, in combination with the hoisting-cables 83, connected as shown and described, for the purpose set forth.

50. The platform 54, the hand-wheel 62, the brake-block 131, operated as shown, and pawls 94 133, in combination with the hoisting-cables 83.

51. The platform 54, the hand-wheel 62, the brake-block 131, operated as shown, and pawls 94 133, in combination with the cables 83, and the tension mechanism.

52. The cords 81, in combination with rollers 85 86, perforated blocks 52, lever 123, the sliding cross-piece 143, which turns the fingers 15 by means of rocking blocks 18, 137, and 136, connected, respectively, by pins 138 139, as shown.

53. The platform 54, the spring-encircled supporting-shafts 29, the hand-wheel 62, the brake-block 131, operated as shown, and pawls 94 133, in combination with the cables 83, and the tension mechanism, as shown.

54. The platform 54, having blocks 127 in the same transverse vertical plane, provided with projecting headed pins 61, in combination with the serrated arms 68, and the pivoted hoisting-levers 39, joined by cross-rod 40, for the purpose shown and described.

In testimony that I claim the foregoing as my own I affix my signature in presence of two witnesses.

JULIUS LAUDE.

Witnesses:
H. J. PECK,
A. STEINLEIN.